FIG. I

INVENTORS
MARK HASTEN
JOHN T. HAUB
VERNE E. WEISS
BY *Robert B. Hughes*

ATTORNEY

March 21, 1967  M. HASTEN ETAL  3,310,006
DOUGH FORMING MACHINE AND PROCESS
Filed Feb. 14, 1964  3 Sheets-Sheet 2

INVENTORS
MARK HASTEN
JOHN T. HAUB
VERNE E. WEISS
BY Robert O. Hughes
ATTORNEY

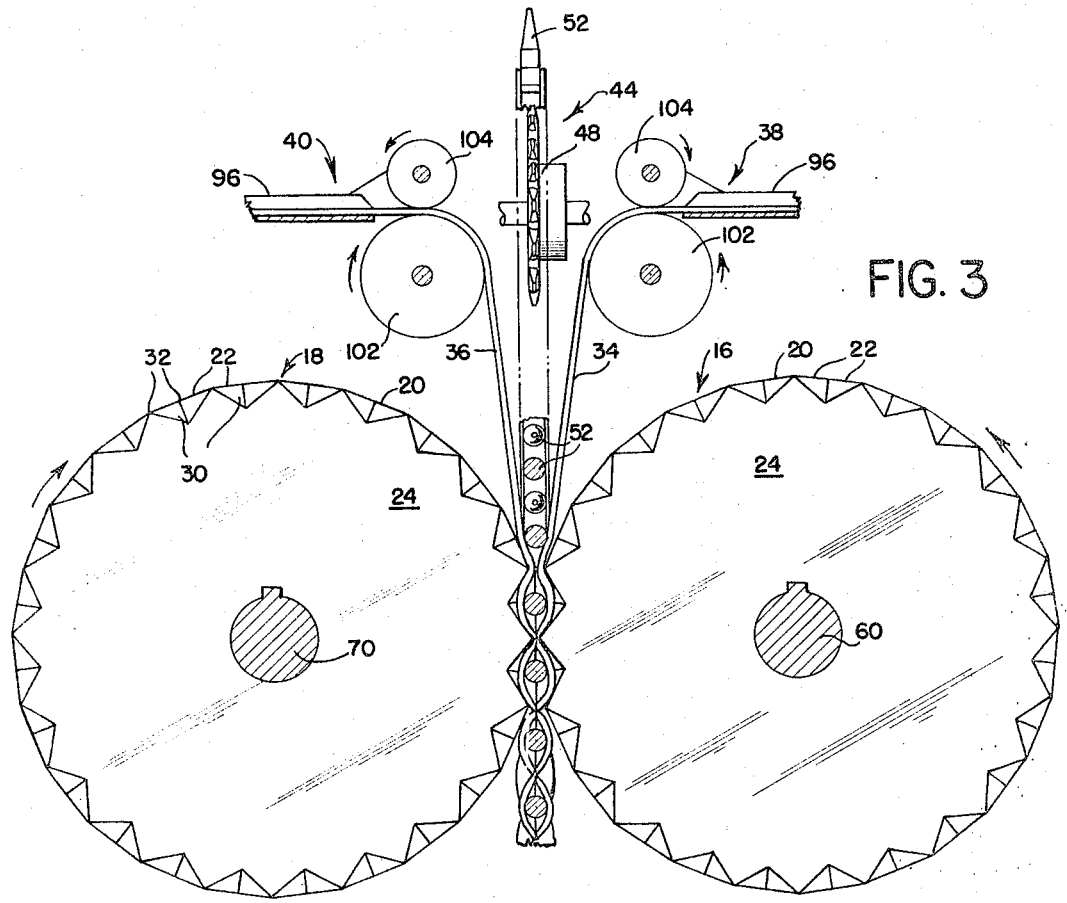

United States Patent Office 3,310,006
Patented Mar. 21, 1967

3,310,006
DOUGH FORMING MACHINE AND PROCESS
Mark Hasten, John T. Haub, and Verne E. Weiss, Minneapolis, Minn., assignors to General Mills, Inc., a corporation of Delaware
Filed Feb. 14, 1964, Ser. No. 345,035
15 Claims. (Cl. 107—1)

This invention relates to a process and apparatus for forming a food material such as a pliable cooked dough into tapered or generally cone-shaped shells.

The subject matter of the present invention was devised specifically to be part of an overall process of making a snack product in which the individual snack pieces have a distinctive tapered or conical shape. Such a configuration is advantageous in various respects; for example, it is strong structurally so that the snack pieces will not readily break or crumble during handling or packaging. Also snack pieces or shells so shaped have an attractive appearance, and when these snack pieces are served, the cavity formed by each shell can very conveniently be filled with a dip or spread.

In making snack items of this general type, there are many variations, but a common method is that a food material (e.g. cereal) is cooked with water and other ingredients to form a moist cooked dough which is fairly pliable. The dough, while still in this pliable condition, is desirably cut or shaped in some manner to form individual snack pieces, which are dried and then deep fried to form the end product.

While it is most practical to form or shape the dough while it is fairly moist and pliable, there are still certain problems involved. For example, the dough is somewhat sticky, which is some source of difficulty. Further, although the dough is pliable, it is still somewhat resilient so that if it is deformed to any great extent, it will tend to pull back somewhat toward its original shape. On the other hand, it is not practical to form the dough with excessive pressures or else the character of the end product may be degraded. Also in cutting or shaping the dough, precaution must be taken against contaminating the same. Understandably these problems are intensified when the formation of dough units is attempted on a large scale commercial operation.

Accordingly, it is an object of the present invention to provide a practical and generally advantageous apparatus and method whereby a material such as cooked dough can expeditiously be formed into shell-like units of generally tapered or conical configuration, and particularly that this be capable of being accomplished on a commercial scale.

It is a further object to provide a method and apparatus which accomplishes the aims of the preceding object by utilizing two strips of material and forming each tapered or conical piece from two tapered parts, one from each strip, which parts are cut and joined along the tapered edges thereof.

Ancillary to this immediately preceding object is the more specific object of accomplishing the forming of the conical or tapered pieces by two tangent oppositely rotating wheels having generally circumferentially disposed zigzag cutting and sealing edge means.

It is yet another object to accomplish the functions recited in the preceding objects, while further utilizing die means to fit between said strips of dough and interfitting with recesses formed in the periphery of the wheels so that the pieces are formed over said die means.

It is a more particular object that the aims of the preceding objects be accomplished by means of two sets of opposed mating or interfitting die members and two sets of cutting members having matching cutting edges extending diagonally back and forth between proximate die members, so as to efficiently and expeditiously form the dough pieces at a high rate of output.

These and other objects and features of the invention will be more readily understood and appreciated from the following detailed description of the preferred embodiments thereof selected for purposes of illustration and shown in the accompanying drawings, in which:

FIGURE 3 is a schematic sectional view of the operating parts seen in a view taken along line 3—3 of FIGURE 2;

FIGURE 4 is a view taken facing a peripheral portion of one of the cutting wheels at the location where it intermeshes with the shaping fingers of the present invention, and showing the manner in which these shaping fingers intermesh with one another and with the cutting wheels;

FIGURE 5 is an enlarged fragmentary front elevational view of a peripheral portion of each cutting wheel at the cutting and forming location thereof, and showing the manner in which two dough sheets are cut and shaped over a shaping finger;

FIGURE 6 is a fragmentary perspective view of a peripheral portion of one of the cutting wheels;

FIGURE 7 is a sectional view taken generally on line 7—7 of FIGURE 2 and illustrating the manner in which the cone-shaped snack pieces are brushed away from the shaping fingers, and FIGURE 8 is a perspective view of a cone-shaped shell or piece formed according to the teachings of the present invention.

Figure 1:
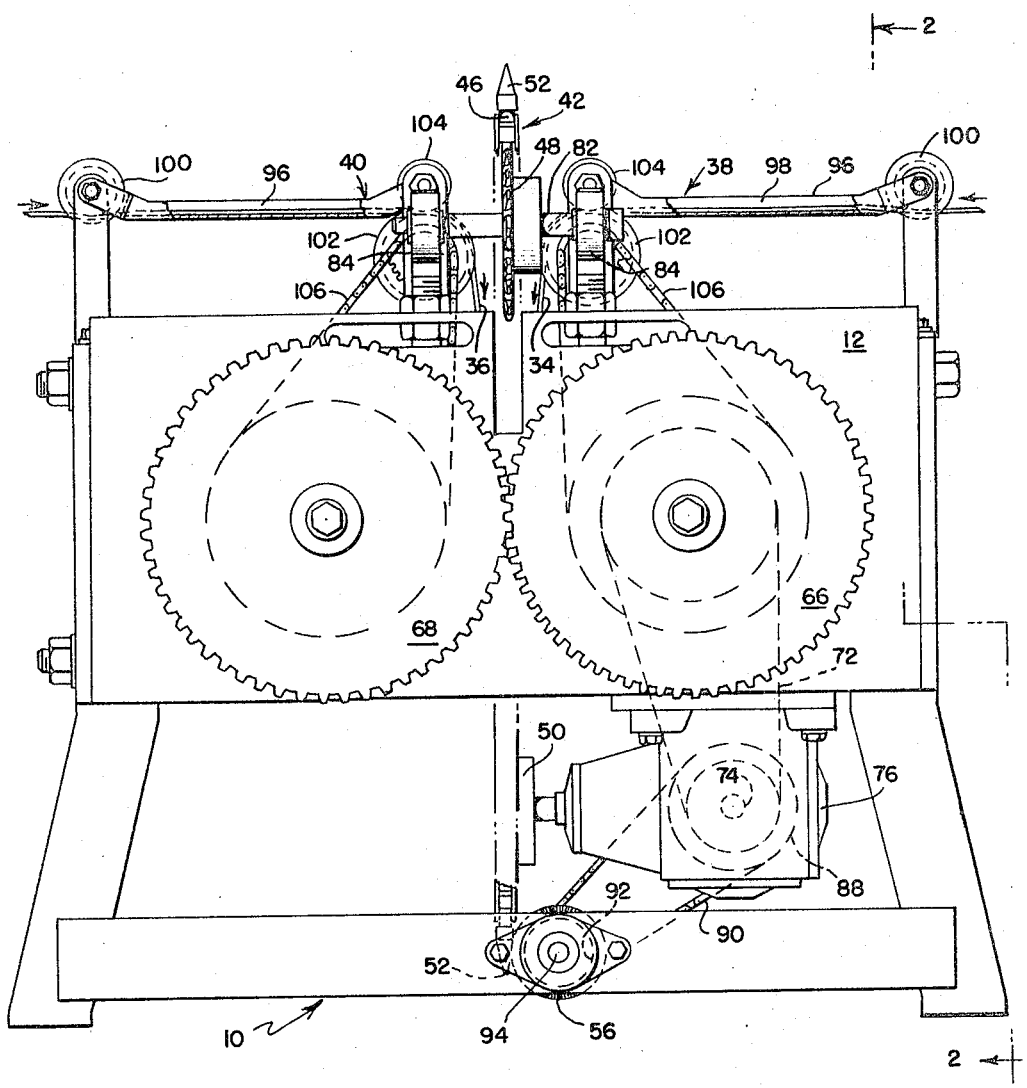
FIGURE 1 is a front elevational view of an apparatus embodying preferred teachings of my invention, this view being taken as indicated at 1—1 of FIGURE 2.
Figure 2:
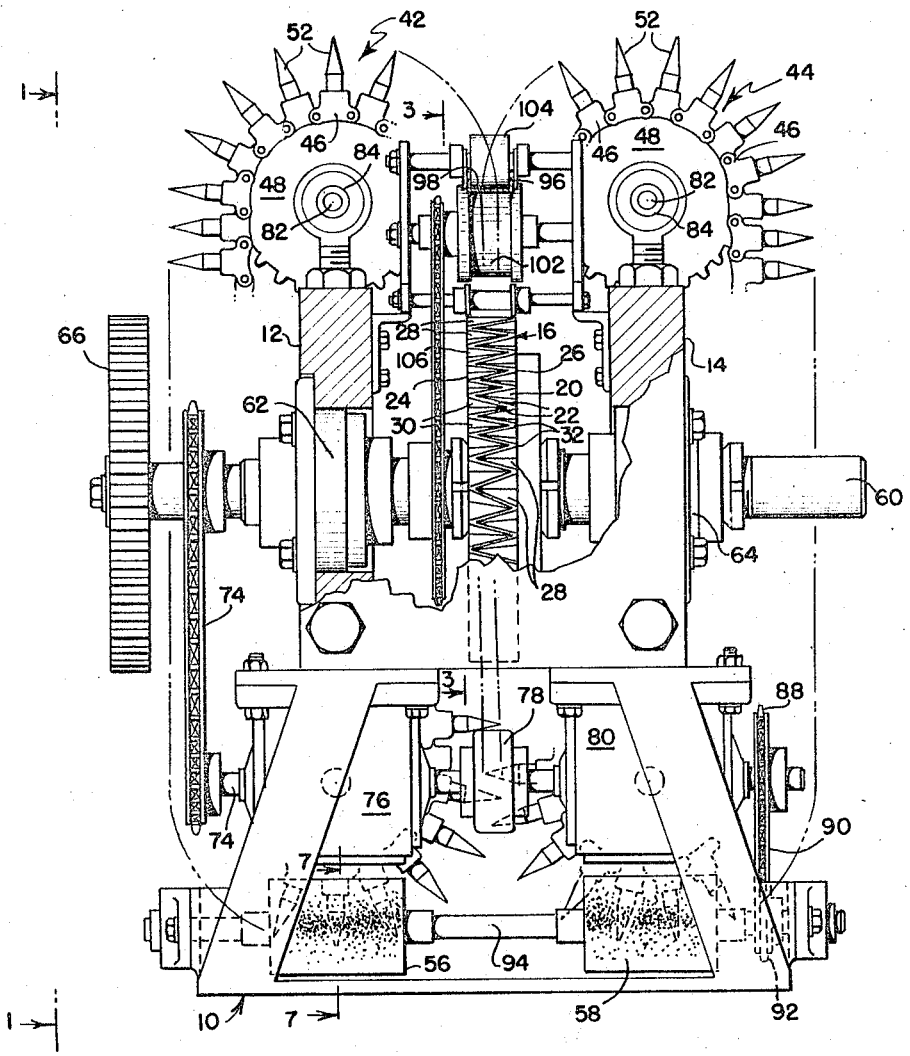
FIGURE 2 is a view taken partly in section and partly in side elevation as long line 2—2 of FIGURE 1.

Referring to the accompanying drawings, numeral 10 designates a base on which are mounted front and rear bearing blocks 12 and 14, respectively. Mounted in these bearing blocks 12 and 14 for rotary motion about a respective one of two longitudinal axes are identical right and left cutting wheels 16 and 18, respectively, positioned side by side and tangent to each other, these being best illustrated in FIGURE 3. The circumferential face 20 of each wheel 16 and 18 is formed with a plurality of blunt cutting edges 22 which extend diagonally across the face 20 in a zigzag pattern along the entire periphery of each of the wheels 16 and 18. Thus it can be seen that each proximate pair of cutting edges 22 define a V, with every other V opening to the front face 24 of its related wheel 16 or 18, and the remaining alternate V's opening toward the rear face 26 of the wheel 16 or 18. Each of the wheels 16 and 18 is recessed or cut away along two angled planes at the location of each V defined by each pair of cutting edges 22 to form a plurality of recesses 28, each such recess 28 tapering from the open end 30 of the V toward the apex 32 of the V, so as to be shaped as one half of a pyramid which is split along its center axis. As will be apparent hereinafter the tapered shape of the recesses 28 can vary to some extent (e.g. be shaped as half a cone split along its center axis), but for ease of manufacture they are desirably formed as shown herein.

The right and left wheels 16 and 18 rotate at the same speed counter-clockwise and clockwise, respectively, in a manner that the cutting edges 22 from the wheels 16 and 18 coincide as they come into contact at the tangent point of the two wheels 16 and 18. As a pair of proximate cutting edges 22 on one wheel 16 comes adjacent to a matching pair of cutting edges 22 on the other wheel 18, the two recesses 28 between such matching pairs of cutting edges 22 collectively form a cavity of a general pyramid-like configuration. As the wheels 16 and 18 continue to rotate a short distance further so that the next proximate cutting edge 22 from the wheel 16 comes adjacent to its matching cutting edge 22 from the wheel 18, the next pair of recesses 28 which come adjacent to one another likewise collectively form a pyramid-like cavity 28–28, which, however, opens in a direction opposite to that of the preceding cavity 28–28.

As will be disclosed more fully hereinafter, two elongate flat strips of dough 34 and 36 are fed in face-to-face relationship between the wheels 16 and 18 by means of two feed roller assemblies 38 and 40. The edges 22 of the two wheels 16 and 18 cut triangular parts from the two dough strips 34 and 36. As before stated, the cutting edges 22 of wheels 16 and 18 are somewhat blunt. The result of this is that each edge along which each of these triangular parts is cut, is sealed to an adjacent edge of the other triangular part to form a generally cone-shaped piece.

To properly shape these pieces in such cone-like configuration, there is mounted to, respectively, the front and rear bearing blocks 12 and 14, a front and a rear shaping unit, designated 42 and 44, respectively. Each shaping unit comprises a vertically disposed endless chain 46 riding on upper and lower sprockets 48 and 50, respectively, and carrying a plurality of evenly spaced fingers or die pins 52 extending outwardly therefrom. The two chains 46 rotate in the same longitudinal vertical plane perpendicular to the plane occupied by the wheels 16 and 18, and each has the downward run thereof located proximate the other so that the shaping fingers 52 of the downward run of both chains 46 intermesh to a moderate degree (as illustrated in FIGURE 4). The fingers 52 are so shaped and disposed, and the chains 46 are so moved in timed relationship with the cutting wheels 16 and 18, that as each pair of matching recesses 28 of the wheels 16 and 18 come adjacent one another to form a cavity 28–28, either a front or a rear shaping finger 52 from, respectively, the front or rear shaping unit 42 or 44 extends into such cavity 28–28. The effect of this is that as each of the dough strips 34 and 36 are being cut, a related finger 52 is shaping the dough pieces (shown at 34a and 36a in FIGURE 5) in the cavity 28–28. Each of the fingers 52 has a general conical configuration to conform to the desired shape of the end product.

As the fingers 52 of the shaping units 42 and 44 progress downwardly from the forming area (i.e. that area between the cutting wheels 16 and 18), each finger 52 carries on it a cone-shaped piece of dough, such as that illustrated at 54 in FIGURE 8. Each such piece 54 is made of two triangular sections 54a and 54b which are sealed along two edges 54c and 54d, with the two triangular parts 54a and b being curved and spread from one another so that the piece 54 has a general conical configuration. As the fingers 52 pass around either of the lower sprockets 50, there is the combination of the force of gravity and a centrifugal force which would tend to remove the dough shells 54 from the fingers 52; and the fact that these fingers 52 taper outwardly would tend to facilitate such removal. However, these dough shells 54 are sufficiently sticky to resist this removal so that there are provided cylindrically shaped front and rear brushes 56 and 58, respectively, mounted for rotary motion about a longitudinally aligned axis, and so disposed that the bristles thereof on their downward path of travel engage the fingers 52 to remove the pieces 54 therefrom. These pieces 54 are then collected by suitable means to be dried and then deep fried to make the finished snack product.

The apparatus of the present invention is driven through a main longitudinally aligned drive shaft 60, journal mounted at 62 and 64 in, respectively, the front and rear bearing blocks 12 and 14, and fixed to and concentric with the right cutting wheel 16. A drive gear 66 fixed to the shaft 60 meshes with a driven gear 68 to turn the left cutting wheel 18 through a shaft 70 which is fixed to both the gear 68 and the cutting wheel 18. The drive shaft 60 through chain and sprocket means 72 turns a shaft 74 to drive a front right angle gear box 76 which through a coupling 78 in turn drives a rear right angle gear box 80. Each of the gear boxes 76 and 80 turns, respectively, the front and rear lower sprockets 50 of the front and rear shaping units 42 and 44. Each of the upper sprockets 48 is mounted by respective one of two shafts 82 to a related pair of vertically adjustable bearing mounts 84 to insure that each of the chains 46 of the shaping units 42 and 44 may be kept taut.

To turn the two aforementioned brushes 56 and 58, there is connected to the rear output shaft of the rear right angle gear box 80 a drive sprocket 88. Engaging this sprocket 88 is a chain 90 which in turn engages a second sprocket 92 to rotate a longitudinal shaft 94 on which are mounted both the brushes 56 and 58.

As mentioned hereinbefore, the two dough strips 34 and 36 are fed into the forming area between the cutting wheels 16 and 18 by means of right and left feed roller assemblies 38 and 40. Each of these assemblies 38 and 40 comprises a horizontal transversely aligned channel piece 96 which defines a guide trough 98 for a related one of the dough strips 34 and 36. At the outer end of each channel piece 96 is a guide roller 100, while at the inner end of each channel 96 is a lower longitudinally aligned feed roller 102 and an upper idler roller 104 adjacent thereto, all the rollers 100, 102 and 104 being mounted from the blocks 16 and 18. Each of the dough strips 34 and 36 passes beneath its related guide roller 100, through the trough 98 defined by the channel 96 and between its related pair of rollers 102 and 104. At the location of the two feed rollers 102 the dough strips 34 and 36 are spaced moderately from each other and travel downwardly therefrom to converge at the forming area between the cutting wheels 16 and 18. The right and left feed rollers 102 are driven from, respectively, shaft 60 and 70 through a related chain and sprocket drive 106.

In operation, the apparatus is driven through the main drive shaft 60 from a suitable power source (not shown). This causes the right and left cutting wheels 16 and 18 to rotate, respectively, counter-clockwise and clockwise, while the endless chains 46 of each of the forming units 42 and 44 travel so that the downward runs thereof travel through the forming area between the two cutting wheels 16 and 18. The peripheral speed of the cutting wheels 16 and 18 is equal to the rate of travel of the fingers 52 at the forming area, and they are so disposed with respect to each other that the fingers 52 fit in the recesses 28 formed in the wheels 16 and 18 as the fingers 52 travel into the forming area between the wheels 16 and 18. The rate at which dough is fed into the forming area between the wheels 16 and 18 by the two roller assemblies 38 and 40 is substantially equal to the peripheral speed of the wheels 16 and 18.

As hereinbefore described, the cutting edges 22 about the circumferential surface of each of the wheels 16 and 18 cut matching triangular pieces 54a and b from each of the dough strips 34 and 36 and at the same time seal the two triangular pieces one to the other along the edges 54c and d. Simiultaneously with this cutting and sealing, each dough piece 54 is formed around a related shaping finger 52 so as to take the conical configuration of its related finger 52. Each triangular piece 54 continues to be carried on its related finger 52 on the downward run of its endless chain 46 until its finger 52 travels downwardly around its lower sprocket 50. At the location of the two sprockets 50, the two brushes 56 and 58 engage the dough pieces 54 which fall into a suitable receptacle or the like to be carried away for further processing. It is to be understood that the precise configuration of the dough pieces 54 can be varied to some degree by use of the method and apparatus of the present invention. For example, if it is desired to form the pieces 54 as truncated cones, this can be done by varying the slant of the cutting edges 22 so that they are separated at the apex 32 of the V's formed by the cutting edges 22, or by diminishing the width of the two dough strips 34 and 36 with respect to the length of the cutting edges 22.

It should be understood that the foregoing is merely illustrative of a certain embodiment of the invention and many variations may be made by those skilled in the art without departing from the spirit and scope of the invention.

We claim:

1. An apparatus to form two flattened strips of dough-like material into tapered shell-like pieces, said apparatus comprising:
    (a) feed means to feed said two strips into a forming area in a manner that said strips are generally proximate and facing one another in said forming area,
    (b) die means to reach between said strips in said forming area,
    (c) cutting and joining means comprising two members having strip engaging portions movable toward one another so as to engage said strips in said forming area with said die means therebetween,
    (d) said cutting and joining means providing cutting and joining edge means which cut across the length of said strips so as to cut two parts therefrom which are joined one to another and formed around said die means in said forming area.

2. An apparatus to form two flattened strips of dough-like material into tapered shell-like pieces, said apparatus comprising:
    (a) feed means to feed said two strips into a forming area in a manner that said strips are generally proximate and facing one another,
    (b) die means to reach between said strips at said forming area,
    (c) cutting and joining means comprising two members having strip engaging portions movable toward one another so as to engage said strips with said die means therebetween, and
    (d) said cutting and joining means providing cutting and joining edge means which cut across the length of said strips so as to cut two parts therefrom which are joined one to another and formed around said die means, said cutting means having a plurality of cutting edges and providing a number of recesses located between said cutting edges and accommodating therein individual die members of said die means, said cutting edges being slanted with respect to one another and said recesses being tapered in the general direction in which said edges are slanted toward one another.

3. The apparatus as recited in claim 2, wherein said cutting edges are so slanted as to be arranged in a general zigzag pattern.

4. The apparatus as recited in claim 2, wherein said die means comprises two carrying means, each of which has a plurality of fingers extending therefrom, said fingers being arranged to fit in the recesses of said cutting means.

5. An apparatus to form two flattened strips of dough-like material into individual tapered shell-like pieces, said apparatus comprising:
    (a) feed means to feed said two strips lengthwise into a forming area in a manner that said strips are generally proximate and facing one another in general parallel relationship at said forming area,
    (b) cutting and joining means comprising two members, each comprising endless strip engaging means movable toward and away from said forming area to engage an outer surface of a related one of said two strips of material,
    (c) said cutting and joining means being arranged with a plurality of cutting and sealing edges, which at said forming area reach across the length of said strips, adjacent cutting edges being slanted with respect to one another so that tapered parts are cut from each strip and joined one to another,
    (d) said cutting and joining means being provided with recesses between adjacent pairs of cutting edges, adjacent recesses tapering oppositely with respect to one another, and
    (e) die means comprising two endless carrying means located on opposite sides of said strip and near side edges thereof, and carrying a plurality of tapered shaping fingers arranged to reach from opposite side edges of said strips between said strips and be positioned in said recesses so as to shape said parts of said strips of material.

6. The apparatus as recited in claim 5, wherein said two members of the cutting and joining means are two wheels arranged side by side and generally tangent to one another, at least one of said wheels being provided with a plurality of cutting edges arranged in a general zigzag pattern about the circumferential face thereof.

7. The apparatus as recited in claim 6, wherein each of said wheels is formed with cutting edges arranged in a general zigzag pattern about the circumferential face thereof.

8. The apparatus as recited in claim 6, wherein said die means comprises a pair of endless chains disposed oppositely to one another and occupying a plane generally at right angles to the plane occupied by said wheels, said wheels being arranged for rotary motion so that the peripheral portions thereof rotate into said forming area, and said endless chains are so arranged as to move into said forming area in the same general direction as the peripheral portions of said wheels.

9. The apparatus as recited in claim 8, wherein there are brush means to remove dough pieces formed on said fingers of the die means.

10. An apparatus to form two flattened strips of dough-like material into individual generally cone-shaped pieces, said apparatus comprising:
    (a) feed means to feed said two strips lengthwise into a forming area in a manner that said strips are generally proximate and facing one another in general parallel relationship at said forming area,
    (b) two cutting and joining wheels arranged side-by-side and generally tangent to one another, the circumferential face of each wheel being formed with a plurality of cutting and joining edges arranged in a general zigzag pattern and matching cutting edges of the other wheel,
    (c) means to rotate said wheels oppositely to one another so that said cutting edges of said wheels come into coinciding engaging relationship so as to cut tapered parts of said material, each of which is joined to a matching part of material from the other strip, each of said wheels being provided with a plurality of tapered recesses each of which is located between a pair of adjacent cutting edges,
    (d) a pair of endless chains located oppositely with respect to one another and occupying a plane generally at right angles to the general plane occupied by said wheels, each chain carrying a plurality of tapered shaping fingers arranged to reach into the recesses provided by said wheels,
    (e) means to move said endless chains so that said fingers move into said forming area at the same rate of speed as that of the circumferential faces of said wheels, whereby tapered pieces formed from material from each strip are formed over each of said fingers, and
    (f) means to remove said pieces of material from said fingers.

11. A process to form two flattened strips of dough-like material into individual tapered shell-like pieces, said process comprising:
- (a) feeding two strips of material into a forming area so that said strips are generally proximate and facing one another,
- (b) moving die means between said strips, and
- (c) engaging an outer face of each strip with cutting and joining means comprising cutting and joining edges slanted with respect to each other, so that said strips are shaped over said die means and parts are cut from each strip and joined one to another so as to form tapered shell-like pieces over said die means.

12. The process as recited in claim 11, wherein said cutting and joining edges are arranged in a general zigzag pattern cutting across the length of said strips.

13. A process to form two flattened strips of dough-like material into individual tapered shell-like pieces, said process comprising:
- (a) oppositely rotating two joining and cutting wheels, said wheels being positioned side by side and tangent to one another, each of said wheels having its circumferential face formed with a plurality of cutting and joining edges arranged in a general zigzag pattern and matching cutting and joining edges of the other wheel, said wheels being formed with tapered recesses located between pairs of adjacent cutting edges, and moving tapered shaping fingers between said strips of material in a manner to fit in said recesses so that said strips of material are shaped over said fingers and a tapered piece of material is formed thereon, and
- (b) feeding said strips of material lengthwise between said wheels in a direction generally parallel to a line tangent to said wheels at the point where said wheels are generally tangent to one another, whereby tapered parts are cut from each strip and joined one to another to form tapered shell-like pieces of said material.

14. An apparatus to form two flattened strips of dough-like material into individual generally cone-shaped pieces, said apparatus comprising:
- (a) feed means to feed said two strips lengthwise into a forming area in a manner that said strips are generally proximate and facing one another in general parallel relationship at said forming area,
- (b) two cutting and joining wheels arranged side-by-side and generally tangent to one another, the circumferential face of each wheel being formed with a plurality of cutting and joining edges arranged in a general zigzag pattern which match cutting and joining edges of the other wheel, said cutting edges being slanted with respect to one another so as to define a V, each of said wheels also being provided with a plurality of tapered recesses formed by a pair of angled planes, each recess being located between a pair of adjacent cutting and joining edges and being tapered in the general direction in which said edges are slanted toward one another, and
- (c) means to rotate said wheels oppositely to one another so that said cutting and joining edges of said wheel come into coinciding engaging relationship so as to cut tapered parts from each of said strips of material, each of which parts is joined to a matching part of material from the other strip.

15. An apparatus to form two flattened strips of dough-like material into individual generally cone-shaped pieces, said apparatus comprising:
- (a) feed means to feed said two strips lengthwise into a forming area in a manner that said strips are generally proximate and facing one another in general parallel relationship at said forming area,
- (b) two wheels arranged side-by-side and generally tangent to one another, the circumferential face of at least one wheel being formed with a plurality of cutting and joining edges arranged in a general zigzag pattern, said cutting edges being slanted with respect to one another, said one wheel also being provided with a plurality of tapered recesses formed by a pair of angled planes, each recess being located between a pair of adjacent cutting and joining edges and being tapered in the general direction in which said edges are slanted toward one another, and
- (c) means to rotate said wheels oppositely to one another so as to cut tapered parts from each of said strips of material, each of which parts is joined to a matching part of material from the other strip.

References Cited by the Examiner
UNITED STATES PATENTS

| | | | |
|---|---|---|---|
| 1,624,849 | 4/1927 | Steele et al. | 18—19 X |
| 2,622,055 | 12/1952 | Lieder | 156—515 X |

WALTER A. SCHEEL, *Primary Examiner.*

J. SHEA, *Assistant Examiner.*